Patented Dec. 8, 1925.

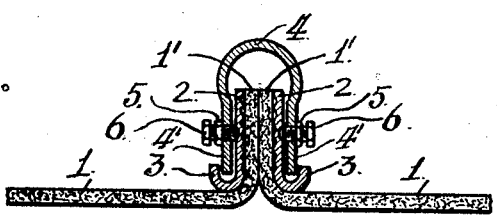
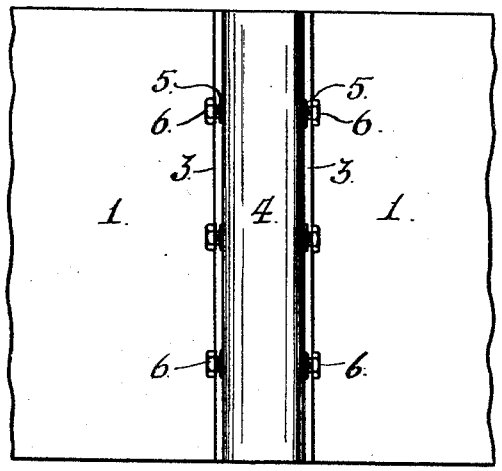
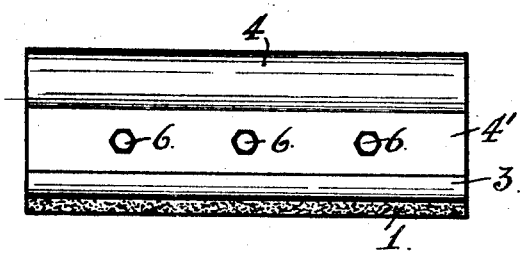

1,565,074

UNITED STATES PATENT OFFICE.

THOMAS ERSKINE AND ADOLPH C. ARNOT, OF TAFT, CALIFORNIA.

BELT CLAMP.

Application filed August 24, 1925. Serial No. 51,890.

*To all whom it may concern:*

Be it known that we, THOMAS ERSKINE, a citizen of Great Britain, and ADOLPH C. ARNOT, a citizen of the United States, residing at Taft, in the county of Kern and State of California, have invented certain new and useful Improvements in Belt Clamps, of which the following is a specification.

Our invention relates to the class of clamps for uniting the adjacent ends of power-transmission belts.

The object of our invention is to provide a simple and efficient clamp, easily applied, and which depends for its gripping effect solely upon friction, thus avoiding the necessity of piercing and thereby tending to weaken the belt.

Our invention consists in a belt clamp comprising novel opposing grip members adapted for frictional contact with the superposed outwardly bent ends of the belt; a sheath member fitted over said grip-members; and pressure studs carried by the sheath member and bearing upon the grip-members to force them upon and clamp the belt ends together. Our invention also consists in certain novel features of construction and arrangement of the several members and parts of the clamp, as we shall hereinafter fully describe by reference to the accompanying drawing in which we show the preferred embodiment of our invention, it being understood that changes may be made in form, arrangement and proportion without departing from the spirit of the invention as defined by the claims hereunto appended.

In the drawings:—

Fig. 1 is a longitudinal section through the belt at its meeting ends showing our clamp, also in section, applied to said ends.

Fig. 2 is a plan view of the same.

Fig. 3 is a side view of the clamp, the belt being in cross section.

The belt 1, has its ends 1', bent outwardly and lying upon one another. 2 are the grip-members of the clamp. There is one of these on each side of the superposed belt ends, and each consists of a plate having a gripping surface about equal to that of the area of the belt end against which it is forced. The face or gripping surface of each grip-member is in its best form, scored or roughened in any suitable manner, as indicated in Fig. 1 in order to increase its frictional contact with the belt end. At one edge, each grip-member is flanged outwardly along the belt proper as shown at 3, said flange in its preferred form being arcuate, in order to serve two purposes, first to be less liable, in case of distorting pressure, to injure the belt, at its angle with its clamped ends, and second, to provide a better seat for the inner edges of the sheath member as will presently appear.

4 is a sheath-member, comprising a plate bent to U-shape. It is fitted over the grip-members 2, the inner edges of its legs 4' being seated in the flanges 3 of said grip-members. This seating of the sheath edges effectually prevents any possible contact of said edges with the belt, and thereby avoids any injury to said belt.

Tapped through nuts 5 and the sides of the sheath-member are the pressure studs 6, the inner ends of said studs bearing upon the outer faces of the grip-members 2. In practise it is best to provide said outer faces with shallow indentations, as indicated in Fig. 1, for the reception of the stud ends.

By setting in the studs 6, the grip-members 2 are pressed upon the superposed belt end, and by frictional contact clamp them together.

We claim:—

1. A belt-clamp comprising separate opposing grip-members adapted for frictional contact with the belt ends; a U-shaped sheath-member fitted over said grip-members; and adjustable pressure studs carried by the opposite sides of said sheath-member and bearing upon the grip-members to force the latter into frictional clamping contact with the belt ends.

2. A belt-clamp comprising opposing grip-members adapted for frictional contact with the belt ends, said grip-members being outwardly flanged along one edge; a U-shaped sheath-member fitted over said grip-members, with the inner edges of its legs bearing on the out-turned flanges of said grip members; and pressure studs carried by said sheath-member and bearing upon the grip-members to force the latter into frictional contact with its belt ends.

3. A belt-clamp comprising opposing grip-members adapted for frictional contact with the belt ends, said grip-members along one edge being outwardly curved to form an arcuate seat-flange; a U-shaped sheath-member fitted over said grip-members, with the inner edges of its legs fitted within the arcuate seat flange of the grip-members; and pressure studs carried by said sheath-member and bearing upon the grip-members to force the latter into frictional clamping contact with the belt ends.

In testimony whereof we have signed our names to this specification.

THOMAS ERSKINE.
ADOLPH C. ARNOT.